Oct. 11, 1927.
W. D. ARMITAGE
1,645,471
INTERNAL COMBUSTION ENGINE
Filed Jan. 11. 1924
4 Sheets-Sheet 1
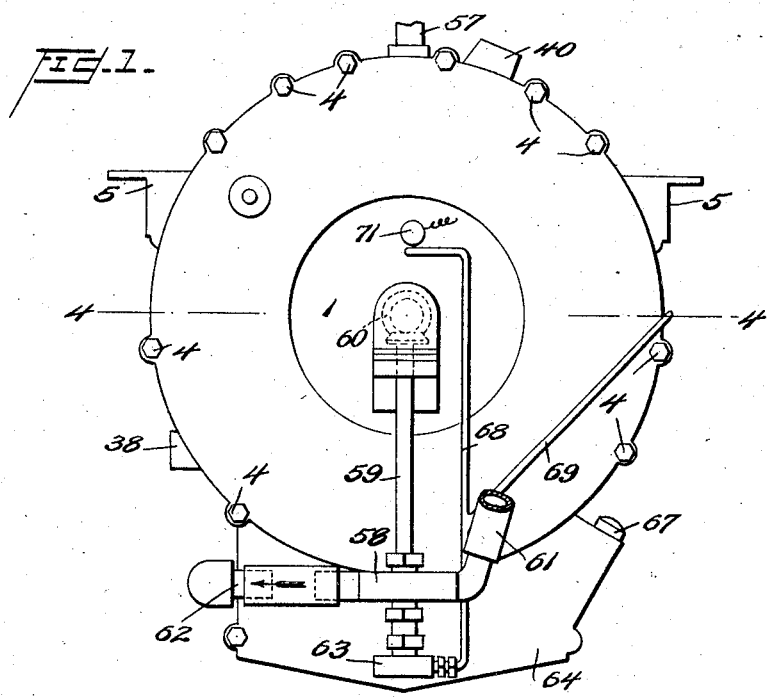
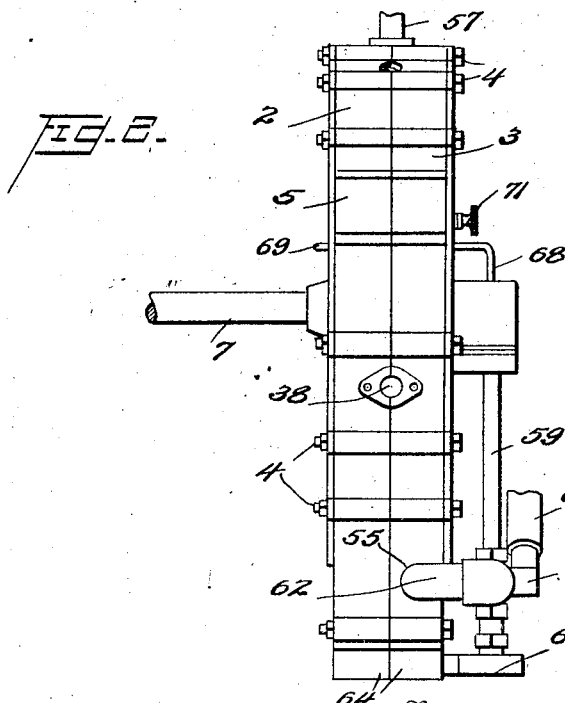

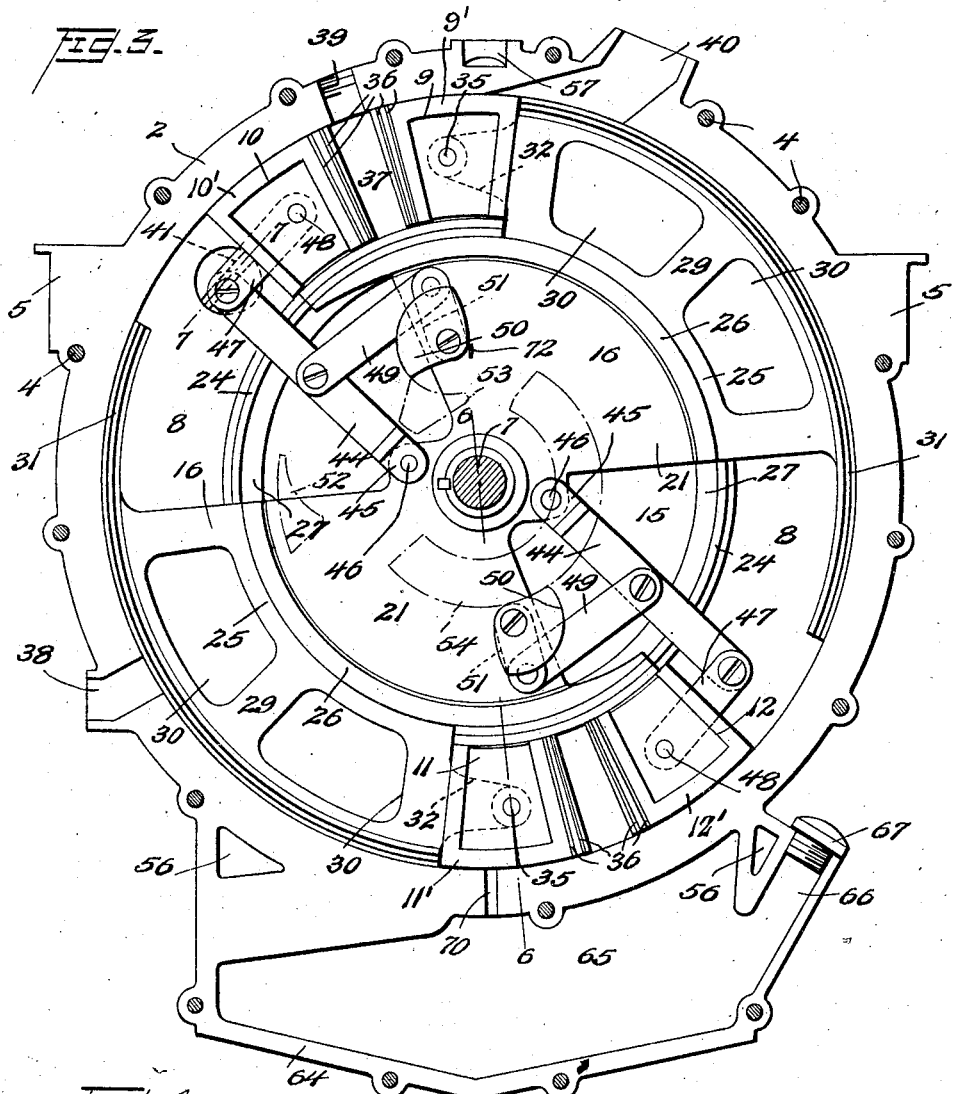
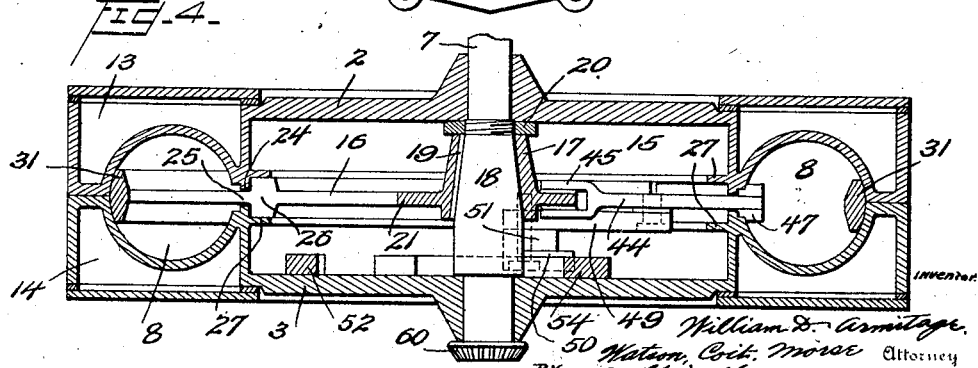

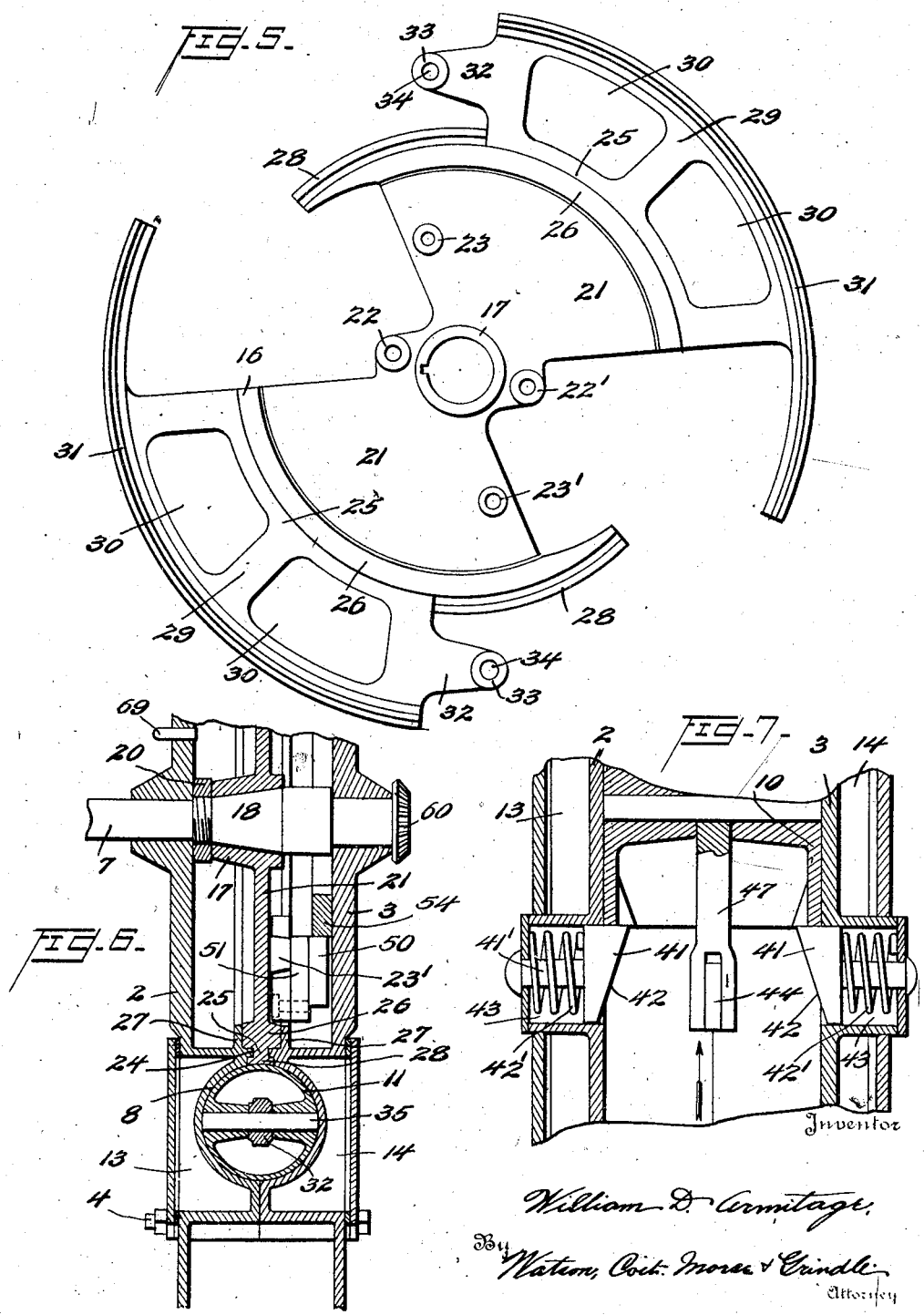

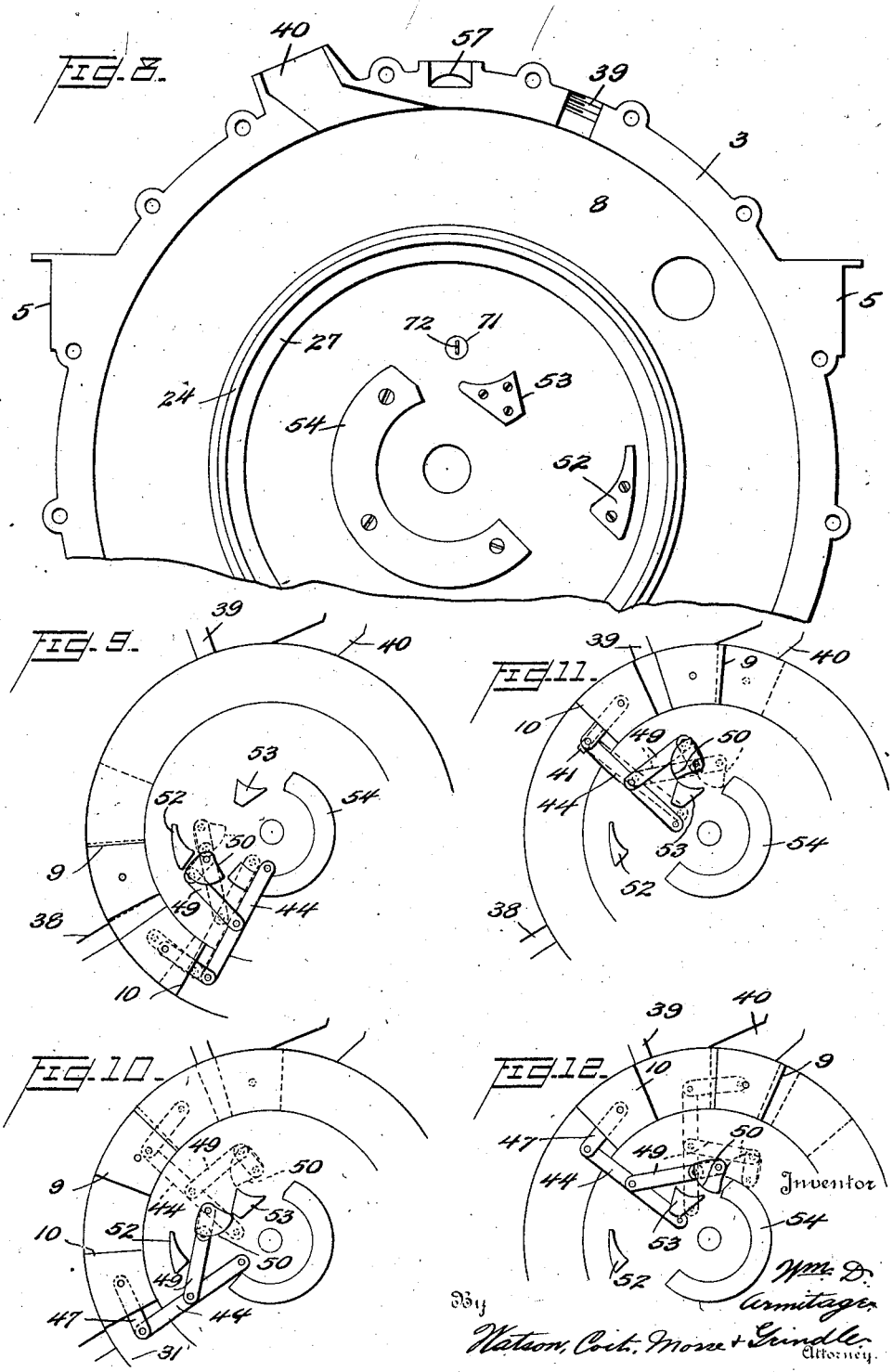

Patented Oct. 11, 1927.

1,645,471

UNITED STATES PATENT OFFICE.

WILLIAM D. ARMITAGE, OF NEW BEDFORD, MASSACHUSETTS.

INTERNAL-COMBUSTION ENGINE.

Application filed January 11, 1924. Serial No. 685,393.

This invention relates to internal combustion engines and more particularly to engines of the type having continuously rotating pistons moving in a cylinder or combustion chamber in the form of a cylindrical ring or torus.

One of the objects of this invention is the provision of an internal combustion engine of the type described in which one of the pistons always moves in the same direction and at a substantially uniform angular velocity around the cylinder or combustion chamber for any given engine speed.

Another object of this invention is to provide a pair of opposed pistons adapted to travel within the combustion chamber at varying speeds relative to each other.

A further object is to provide an internal combustion engine having a moving system in which there are no parts reciprocating in a direction normal to the axis of rotation of the main engine shaft and in which the rotating system is at all times in true static and dynamic balance.

A still further object is the arrangement of an internal combustion engine wherein one cylinder produces the same effect as four cylinders in the normal type of four stroke-cycle internal combustion engine both as to power and number of power strokes per revolution.

There is further provided by this invention an internal combustion engine having a toroidal combustion chamber in which are arranged a pair of opposed pistons adapted to cover and uncover the exhaust and intake ports in one of the walls of the combustion chamber and means for maintaining the intake port closed at all times except when the pistons are inducing a charge of combustible mixture.

Further important features and objects of this invention will become apparent to those skilled in the art as my invention is more fully disclosed in the accompanying specification and drawings.

Broadly and briefly stated, my invention contemplates providing an internal combustion engine including a stationary combustion chamber in the form of a hollow torus; a fly wheel adapted for rotation about an axis concentric with that of the torus and extending through the inner wall of the combustion chamber; a pair of opposed pistons arranged to travel in one direction about said combustion chamber, one of said pistons being fixed for rotation with said fly wheel and the second of said pistons being connected to said fly wheel by mechanism permitting the distance between said pistons to vary between fixed limits; stationary means adapted to cooperate with said mechanism for varying the distance between said pistons; an intake port; an exhaust port; and a spark plug.

In the drawings accompanying this specification:

Fig. 1 is a side elevation of an internal combustion engine constructed in accordance with my invention;

Fig. 2 is an elevation at right angles to Figure 1 showing a single cylinder engine;

Fig. 3 is an elevation showing the right hand half of the casing, as shown in Figure 2, removed, with the fly wheel and pistons in place, and showing by dotted lines the positions of the stationary cams which are fastened to the removed section;

Fig. 4 is a section on line 4—4 of Figure 1;

Fig. 5 is a side elevation of the fly wheel;

Fig. 6 is a partial section on line 6—6 of Figure 3;

Fig. 7 is a section on line 7—7 of Figure 3;

Fig. 8 is an elevation of the inside of the right hand half of the engine casing;

Fig. 9 is a more or less diagrammatic view showing the positions of a pair of pistons at the beginning and the end of the intake stroke;

Fig. 10 is a similar view showing the positions of the pistons at the beginning and end of the compression stroke;

Fig. 11 is a similar view showing the positions of the pistons at the beginning and end of the power stroke; and Fig. 12 is a similar view showing the positions of the pistons at the beginning and end of the exhaust stroke.

Viewed in Figures 1 and 2 my internal combustion engine comprises in general a cylindrical housing or casing 1 composed of two similar interfitting parts 2 and 3 held together by bolts 4 passing through bosses spaced about the periphery of the cylinder. Mounting brackets 5 are provided whereby the engine may be hung from any suitable support, such as the side frame members of an automotive vehicle to which use my type of engine may be put. The parts 2 and 3 of the engine casing are substantially circular in form and each flat side wall is provided at the center thereof with a boss drilled to form a bearing for the main shaft 7 of the engine.

As viewed in Figures 3 and 4 it will be seen that the engine casing is divided into four main compartments each substantially circular in form. The chamber 8 which is circular in cross section is a hollow torus and comprises a combustion chamber in which the pistons 9, 10, 11 and 12 are adapted to travel. The compartments 13 and 14 which substantially enclose the combustion chamber are water jackets through which the cooling water is adapted to circulate and carry off the heat of combustion from the motor. A cylindrical chamber 15 is adapted to house the fly wheel 16 and other parts of the motor to be mentioned later and also provides means for distributing lubricating oil.

The fly wheel 16 which is clearly shown in Figures 3, 4, 5 and 6 is of substantially circular form with two diametrically opposite, irregular shaped portions removed. It has an enlarged hub member 17 fitting upon the tapered section 18 of the shaft 7, is held against rotation in respect thereto by means of a key 19 and against longitudinal movement by means of a nut 20 threaded upon the shaft. Extending radially from the hub member is a thin central web 21 provided with the bosses 22, 22', 23, 23' which are drilled for the reception of pivot bolts the use of which will be described later. The fly wheel is adapted to fit through a narrow circular slot 24 in the wall of the combustion chamber and is hence provided with a pair of thin sections 25, 25 of a thickness just sufficient to snugly engage the side walls of this slot. Between these thin sections 25 and the web sections 21 the fly wheel is provided with two heavy inner rim portions 26, 26 adapted to fit snugly against the inwardly extending radial flanges 27, 27 bordering the circular slot in the combustion chamber walls. Inside of the cylinder the fly wheel broadens as shown at 28 snugly engaging the walls of a widened slot which is a continuation of the narrow slot 24. This widened portion has its outer face shaped to conform to the curve of the cylinder wall and it is the object of these various interfitting flanges, grooves and so on, to provide a gastight seal between the cylinder and the fly wheel, which, when bathed in oil during normal operation of the motor, will prevent the escape of the compressed combustible charge and the gases resulting from the explosion.

Referring to Figure 5 it will be seen that the portions 25 and 26 of the fly wheel are co-extensive and each of substantially 130° extent, whereas the thickened portion 28 is of approximately 30° extent. Radiating from the portions 26 are the thin webs 29 provided with the openings 30 for the sake of lightness and having the heavy rim portions 31 shaped to conform to the outer wall of the combustion chamber and ground to a snug fit therewith. The web members 29 have less angular extent than the portions 25 while the rim sections 31 are of similar angular extent to the inner rim members 26 but offset in respect thereto.

Extending circumferentially from the web members 29 are the extensions 32 provided with integral bosses 33 drilled transversely as shown at 34 for the reception of wrist pins 35 by means of which the pistons 9 and 11, which I will hereafter call power pistons, are maintained in fixed relation to, and for movement with, the fly wheel.

I contemplate providing each explosion cylinder or combustion chamber with two pairs of pistons, as shown in Figure 3, each pair comprising a power piston 9, 11 connected for movement with the fly wheel and a following or explosion piston 10, 12 movable within fixed limits in respect to the power piston and the fly wheel. These pistons may be of the usual construction except that they are shaped to conform snugly to the curved cylinder wall and are each provided with suitable piston rings 36 for maintaining the compression.

It may be desirable to relieve the walls of the pistons between the ends to reduce the friction on the cylinder walls but a rib 9', 10', 11', 12' is left on each piston on its outermost face for a purpose to be later described.

The compartment 37 formed between a pair of pistons such as 9 and 10 varies in size during the operation of the motor and corresponds to the cylinder and combustion chamber in the usual type of internal combustion engines. This compartment rotates with the fly wheel during the normal operation of the engine and successively passes the intake port 38, the spark plug opening 39 and the exhaust port 40 all of which open into the outer wall of the explosion chamber. Before reaching the intake port 38 the pistons are spaced as shown at 37 in Figure 3, which is the minimum distance allowed between these pistons.

Immediately upon the piston 9 fully uncovering port 38 piston 10 is retarded in speed so that before the port 38 is again closed off by piston 10 the two pistons have separated a maximum permissible distance which ordinarily corresponds to a compression ratio of about 4 to 1 although any desired ratio may be used. The intake port 38 is then closed by the rib 10' on piston 10 and as this piston moves forward by the outer rim 31 of the fly wheel. Upon this happening the piston 10 moves forward more rapidly than piston 9 compressing the charge between the two pistons until at the time the compartment 37 reaches the spark plug opening 39 the pistons are again in the closest position. At this point an electric spark takes place at the spark plug, firing the charge which expands and drives the piston 9 forward, the piston 10 being restrained against rearward movement by means of latches 41 best shown in Figure 7.

The latches 41 include wedges having inclined faces at 42 adapted for reciprocation in recesses 43 in the cylinder walls and having integral therewith the stop pins 41′ which are headed over beyond the rear walls of the recesses to retain the wedges in the position shown in Fig. 7 against the action of the springs 42′. The lower ends of these wedges as viewed in Fig. 7 are below the surface of the cylinder walls and with the inclines facing toward the approaching pistons so that a piston moving in the direction of the arrow in Figure 7 will press against the faces 42 and thus push the wedges 41 down into the chambers against the action of the springs 42′. Immediately upon the passage of the piston the wedges 41 will be pressed outward into the position shown in Figure 7 effectually preventing any reverse movement of the piston.

When under the influence of the explosion charge the pistons 9 and 10 have reached their maximum distance apart the piston 9 begins to uncover the exhaust port 40 and the piston 10 is caused to again increase in speed so that before the exhaust port 40 is closed by the piston 10, the compartment 37 has been reduced to its minimum size thus driving out the burned gases. The pistons 9 and 10 continue their forward movement with the compartment 37 remaining a minimum until the intake port 38 is again reached when the cycle of operation is repeated. As shown in Figure 3 the engine is provided with two sets of pistons so that for each revolution of the fly wheel there are two power strokes corresponding in effect to the usual four-cylinder four-cycle engine wherein there are a like number of power strokes for each revolution of the crank shaft.

In order that the explosion pistons 10 and 12 may move at different speeds than their corresponding power pistons, I have devised the following mechanism and since it is the same in each case a description of that in connection with piston 10 will suffice for both. A connecting rod 44 provided with a forked end 45 fits over the boss 22 and pivots on a suitable bolt 46 passing through the connecting rod and fly wheel. Pivoted to the opposite end of this connecting rod is a connecting rod link 47 journalled at its end remote from the pivot on a wrist pin 48 fixed within the piston 10. Intermediate the ends of the connecting rod is pivoted a cam bar 49. Pivoted for rotation about a suitable bolt threaded in the boss 23 of the fly wheel is a cam 50 substantially segmental in shape, having integral therewith a cam arm 51, which cam arm is pivoted at its remote end to the opposite end of the cam bar 49 whereby upon rotation of the cam 50 about its pivot 23 motion is transmitted to the cam arm 51, through the cam bar 49, to the connecting rod 44 and since this is pivoted at its inner end to the fly wheel, motion is imparted to the piston 10 by means of the connecting rod link, so that the piston moves relative to the fly wheel.

As shown best in Figures 4 and 8 three stationary cams 52, 53 and 54 are arranged against one of the outer walls of the chamber 15 and are adapted to be successively engaged by the movable cam 50 as it is rotated with the fly wheel, to cause it to revolve about its pivot and move the piston 10 relative to the fly wheel and the piston 9. These cam members may be formed integral with the engine casing or may be attached thereto by suitable fastening means as shown in Figure 8.

Referring now to Figures 9, 10, 11 and 12 the action of these cams will be explained throughout the cycle of operation of one set of pistons. Figure 9 shows in full lines the positions of the two pistons 9 and 10 at the beginning of the intake stroke where it will be seen that the pistons are closest together and as piston 9 fully uncovers the intake port the cam 50 engages the forward end of the stationary cam 52 in such a manner as to be rocked backward thereby thus retaining the piston 10 almost stationary as the piston 9 moves forward so that the chamber 37 is enlarged and draws in a charge of combustible mixture through the intake port 38 which is connected to any suitable type of carburetor. At the time the intake port is closed off by the piston 10 the two pistons have reached their greatest distance apart and a full charge of combustible mixture is contained between them. The pistons then move in unison until the outer rim 31 of the flywheel has closed the intake port. When the pistons are a maximum distance apart the links 49 and 51 are in a straight line and the rear of piston 10 just touches the rim 31.

Referring to Figure 10 it will be seen that as soon as the intake port is closed by the rim 31 the cam 50 engages the stationary cam 53, the cam arm 51 draws the cam bar 49 forward, and with it the connecting rod and piston 10 so that this piston travels at a greater speed than piston 9 thereby compressing the charge between the two pistons which compression operation is completed just as the cam 50 leaves the cam 53 and the space 37 between the two pistons, now a minimum, is opposite the spark plug.

At this time as shown in Fig. 11 the latch bar 41 drops behind the piston 10, the cam 50 is released from the cam 53 and the explosion takes place, piston 10 remaining stationary against the latch 41 while piston 9 moves forward delivering its energy to the fly wheel and thence to the load connected to the engine shaft. Throughout this power stroke as shown in Figure 11 the cam member 50 is free to be rotated under the action of the connecting rod.

Just at the completion of the power stroke as the power piston 9 begins to uncover the exhaust port 40 the cam 50 engages with the long stationary cam 54 as shown in full lines in Figure 12. This causes the inner end of cam 50 to be retarded thus advancing piston 10 more rapidly than piston 9 in a similar manner to that which took place during the compression stroke, as previously explained, so that by the time piston 10 has closed off the exhaust port 40 the pistons are again at their minimum distance apart and the waste products of combustion have been expelled from between them. The pistons retain this position of minimum distance apart under the action of the stationary cam 54 until the intake port 38 is again uncovered by piston 9 when the operation is repeated. It is of course to be understood that a similar action takes place in connection with pistons 11 and 12 as they pass the various ports.

It will be noted that throughout their complete cycle the pistons 9 and 10 ride upon the portion 28 of the fly wheel rim so that the space between the pistons is effectually sealed from the compartment 15 in which the cams operate. It will be further noted that the outside rim 31 of the fly wheel closes off the intake and exhaust ports except at such times as the compartment 37 between the pistons uncovers this port it being noted that the circumferential distance between the two rim sections 31 is just great enough to accommodate the two pistons when they are at their maximum distances apart in which condition these pistons pass the intake port. If desired the forward end of these rim sections 31 may form an abutment limiting the distances between the pistons 9 and 10 in order to reduce any strain upon the cam 50 and its corresponding movable parts at such times as the pistons move at their maximum distance apart.

As explained earlier this motor is adapted to be cooled in the conventional manner by water passing through the jackets 14 and 15 surrounding the explosion chamber and I have shown at 55 the intake opening whereby the water is pumped into one of these water jackets the two parts of the water jacket being connected together by means of the registering openings 56. At 57 is shown the outlet for the water, half of this opening being in each half of the engine casing so that water from each half may flow out from this outlet. To provide for proper circulation I have shown a water pump 58 which may be of any convenient type adapted to be driven by the shaft 59 and connected by means of bevel gears 60 to the main shaft 7. A tube 61 serves to conduct water to the pump and a pipe 62 conducts it from the pump to the inlet opening 55.

Driven from the same shaft as the water pump is an oil pump 63 of any convenient type mounted on the lower extension 64 of the casing which extension contains the compartment or oil sump 65 which can be filled through the filler opening 66 closed by a convenient cap 67. The pump 63 draws oil from the sump 65 and by means of the pipe 68 branched at 69 delivers the oil to the inside of the casing in the compartment 15 just above the two bearings for the shaft 7. The oil runs down the inner walls of this compartment, passes over and lubricates the main bearings, the excess oil forming two pools in the bottom of the compartment 15 between its outer walls and the two radial flanges 27 into one of which pools of oil the cam arm 51 and cam bar 49 are adapted to dip, thus splashing the oil in a manner similar to that accomplished by the large ends of the connecting rods in the ordinary type of splash lubrication in automotive type internal combustion engines thus maintaining a fine spray or mist of oil within the compartment 15 which lubricates all of the working parts of the motor. The pool of oil in the opposite compartment overflows the flange 27 and serves to lubricate the fly wheel where it fits through the slot in the cylinder wall keeping this joint tightly sealed. The excess oil at this point flows on to the cylinder walls and is picked up by the pistons, which are thus freshly lubricated each time before undergoing the intake, compression, power and exhaust strokes as previously explained. The excess oil flows out through the bore 70 and is thus returned to the sump or reservoir 65.

In order to maintain a water, gas and oil-tight seal between the two halves 2 and 3 of the engine casing, it is contemplated that their meeting surfaces be ground to an exact plane in order that they shall have a perfect fit when brought together and clamped by the bolts 4. As an alternative a thin compressible gasket may be placed between the meeting faces. The engine is assembled by fitting the fly wheel on its shaft, connecting all parts to the fly wheel that move therewith and then assembling the two halves of the engine casing around the fly wheel, bolting the two halves of the casing together and applying the intake and exhaust manifolds, spark plug, etc., not shown.

In order to properly time the explosion I contemplate using the ignition contacter 71 which is mounted upon the outer wall of the engine housing and has an insulated spring contact member 72 which extends through the wall of the housing and is adapted to be engaged by the cam 50 to close a circuit at the time when the compartment 37 is exactly centered below the spark plug opening 39. The usual type of ignition coil, supplying a high tension current to the spark plug, may be used and since this is well known, I do not deem it necessary to illustrate or describe it here.

It will thus be seen that I have provided an internal combustion engine which is of very simple design, has a minimum number of parts and weighs much less than an engine of the conventional type of the same horsepower. It can be arranged to add any number of units desired in tandem, acting on the same main shaft to obtain any power desired and any unit may be removed for repairs without disturbing the remaining units. Owing to its inherent balance this motor is absolutely vibrationless at all speeds. The number of moving parts in a motor according to my invention is very small, there being but two gears used, to drive the oil and water pump, and in any single unit there are less than two dozen moving parts including the water and oil pumps.

It will further be understood that during the explosion stroke the power is at all times applied at a uniform distance from the main shaft and with a maximum lever arm which is not the case in the usual type of internal combustion engines. This motor furthermore has no dead center as is customary in the usual reciprocating type of motor and it will thus be seen that the possibility of detonation and the corresponding, annoying noise will be absent. Due to the entire absence of any valves the motor will be considerably more quiet than the poppet valve type of motor and will not have to be dismantled frequently for the operation of grinding valves.

From the above description it will be clear that I have invented a material improvement in internal combustion engines, and while I have shown by way of explanation one modification it is to be understood that I do not wish to be limited to this particular form.

Having thus described the invention what is claimed as new and desired to be secured by Letters Patent is:

1. In an internal combustion engine of the class described, a toroidal combustion chamber, a flywheel rotatably mounted about the axis of said chamber and extending therein to the outer wall thereof, a power piston rigid with said flywheel, an explosion piston, a piston rod connecting said explosion piston to a point near the center of said flywheel, a cam, having a cam-bar, pivoted to said flywheel and a link connecting said cam-bar and an intermediate point in said connecting rod.

2. In an internal combustion engine of the class described, a toroidal combustion chamber, a flywheel rotatably mounted about the axis of said chamber, extending through the inner wall thereof and contacting with the outer wall thereof, a power piston rigid with said flywheel, an explosion piston, a piston rod connecting said explosion piston to a point near the center of said flywheel, a cam, having a cam-bar, pivoted to said flywheel, a link connecting said cam-bar and an intermediate point in said connecting rod, and a stationary cam adapted to be engaged by said cam on said flywheel.

3. In an internal combustion engine of the class described, a toroidal combustion chamber, a flywheel rotatably mounted about the axis of said chamber and extending therein, a power piston rigid with said flywheel, an explosion piston, a piston rod connecting said explosion piston to a point near the center of said flywheel, a cam, having an integral cam-bar, pivoted to said flywheel, a link connecting said cam-bar and an intermediate point in said connecting rod, and a pair of stationary cams adapted to be successively engaged by opposite faces of said cam on said flywheel to rotate it in opposite directions.

In testimony whereof I hereunto affix my signature.

WILLIAM D. ARMITAGE.